United States Patent [19]

Müller

[11] Patent Number: 4,625,590
[45] Date of Patent: Dec. 2, 1986

[54] CONTROL APPARATUS FOR AN AUTOMATIC TRANSMISSION

[75] Inventor: Alfred Müller, Leonberg, Fed. Rep. of Germany

[73] Assignee: Robert Bosch GmbH, Stuttgart, Fed. Rep. of Germany

[21] Appl. No.: 258,547

[22] Filed: Apr. 28, 1981

[30] Foreign Application Priority Data

May 10, 1980 [DE] Fed. Rep. of Germany ....... 3018032

[51] Int. Cl.$^4$ ............................................. B60K 41/04
[52] U.S. Cl. ...................................... 74/866; 364/424
[58] Field of Search ........................... 74/866; 364/424

[56] References Cited

U.S. PATENT DOCUMENTS 4,044,634  8/1977  Florus et al. .......................... 74/866
4,335,428  6/1982  Miki et al. ............................ 364/424

FOREIGN PATENT DOCUMENTS 28521  6/1980  Fed. Rep. of Germany .

Primary Examiner—James A. Leppink
Assistant Examiner—Frank Mc Kenzie
Attorney, Agent, or Firm—Frishauf, Holtz, Goodman & Woodward

[57] ABSTRACT

The desired acceleration, a value required to determine shift points in an automatic transmission, is computed on the basis of the measured speed, output torque of the transmission, and the tractive resistance at rated load on a level road. Additionally, a shift which is otherwise indicated is suppressed when the computed output torque of the transmission in the new gear is less than the actual tractive resistance. Preferably an incremental value is added to the tractive resistance prior to comparison with the output torque in the new gear, so that hunting is prevented. The incremental resistance value, which is added to the tractive resistance, may be a constant or may vary as a function of speed.

4 Claims, 2 Drawing Figures

CONTROL APPARATUS FOR AN AUTOMATIC TRANSMISSION

CROSS REFERENCE TO RELATED APPLICATIONS AND PUBLICATIONS

German published appln. No. P 28 52 195.1.

The above publication is hereby incorporated by reference into the present application.

The present invention relates to control apparatus for the automatic transmission in a motor vehicle.

BACKGROUND OF THE INVENTION

In the cross-referenced published German application, means are provided for continually changing the shift point of an automatic transmission in dependence on the actual resistance to travel, namely the resistance to vehicle travel which takes the load and the slope of the road into consideration. Specifically, the actual measured acceleration of the vehicle is compared to the theoretical value of the acceleration at a predetermined load, for example the minimum load on a level road, or a value derived therefrom. The difference between the two values constitutes a correction signal for changing the shift point.

THE INVENTION

It is an object of the present invention to furnish apparatus which determines the value of the desired acceleration in a particularly simple way. This causes the cost of the equipment to be decreased.

It is a further object of the present invention that the parameters for computing the desired acceleration are so chosen that variation in the motor characteristics and the hydrodynamic converter due to manufacturing tolerances need not be considered and that friction losses can also be ignored. This causes the comparison between the desired and actual acceleration to be more exact.

A speed sensor which is present in the vehicle in any case furnishes one of the required signals. The second signal on which the computation is based is a torque signal indicative of the transmission output torque. This torque signal can also be used for determining the proper pressure for the friction elements of the transmission. The resistance to travel of the vehicle at some nominal load on a level road is also determined and the desired acceleration is then computed from an equation which takes into consideration the mass of the vehicle, as well as the constants related to the particular transmission.

In addition, the shift is only carried out when the output torque in the new gear exceeds the resistance to travel.

DRAWINGS DESCRIBING A PREFERRED EMBODIMENT

FIG. 1 is a three-dimensional shift characteristic resulting from use of the present invention; and FIG. 2 is a block diagram of the control system of the present invention.

DESCRIPTION OF THE PREFERRED EMBODIMENT

The shift characteristics for known automatic transmissions in motor vehicles optimize operation under the normal operating conditions, that is they operate best when the vehicle is on a level road under some nominal load. However, the motor output decreases when the vehicle is at great heights. When the characteristic shift curves depend on a load signal such as, for example, the vacuum pressure in the inlet or the air volume in the inlet, a change in the shift characteristic curves can occur simultaneously. These effects combine so that the characteristic curves which are permanently set into the automatic transmission control do not produce optimal motor output or minimum use of fuel under certain operating conditions. The same is true when the mass of the vehicle or the air resistance thereof is increased substantially, as may be the case when driving with luggage on the roof or with a trailer. Further, it may be desirable when driving in the mountains to delay upshifts, so that the motor output can be better utilized.

To prevent the above-mentioned difficulties, a change in the characteristic shift curves takes place in dependence upon the then-present operation condition of the motor vehicle. Specifically, the actual value of acceleration is measured and is compared to a desired acceleration value.

The desired acceleration is computed as described above, the resistance to travel being determined by a computing stage wherein values of tractive resistance to travel are stored which are read out when the storage locations storing these values are addressed by the signal indicating the then-present speed of the vehicle.

The desired acceleration is then computed according to the equation:

$$m_F b_{desired} = M_{out} \ddot{u} \eta - W$$

where $m_F$ is the mass of the vehicle, $\ddot{u}$ is the product of the transmission ratio of the differential and the main pinion radius, and $\eta$ is the efficiency of the drive train.

It is to be understood that the transmission input torque $M_{in}$ can be substituted for the output torque $M_{out}$. Then $\ddot{u}$ is a factor derived from the then-present transmission ratio, main pinion radius and axle speed reduction.

Figure 1:
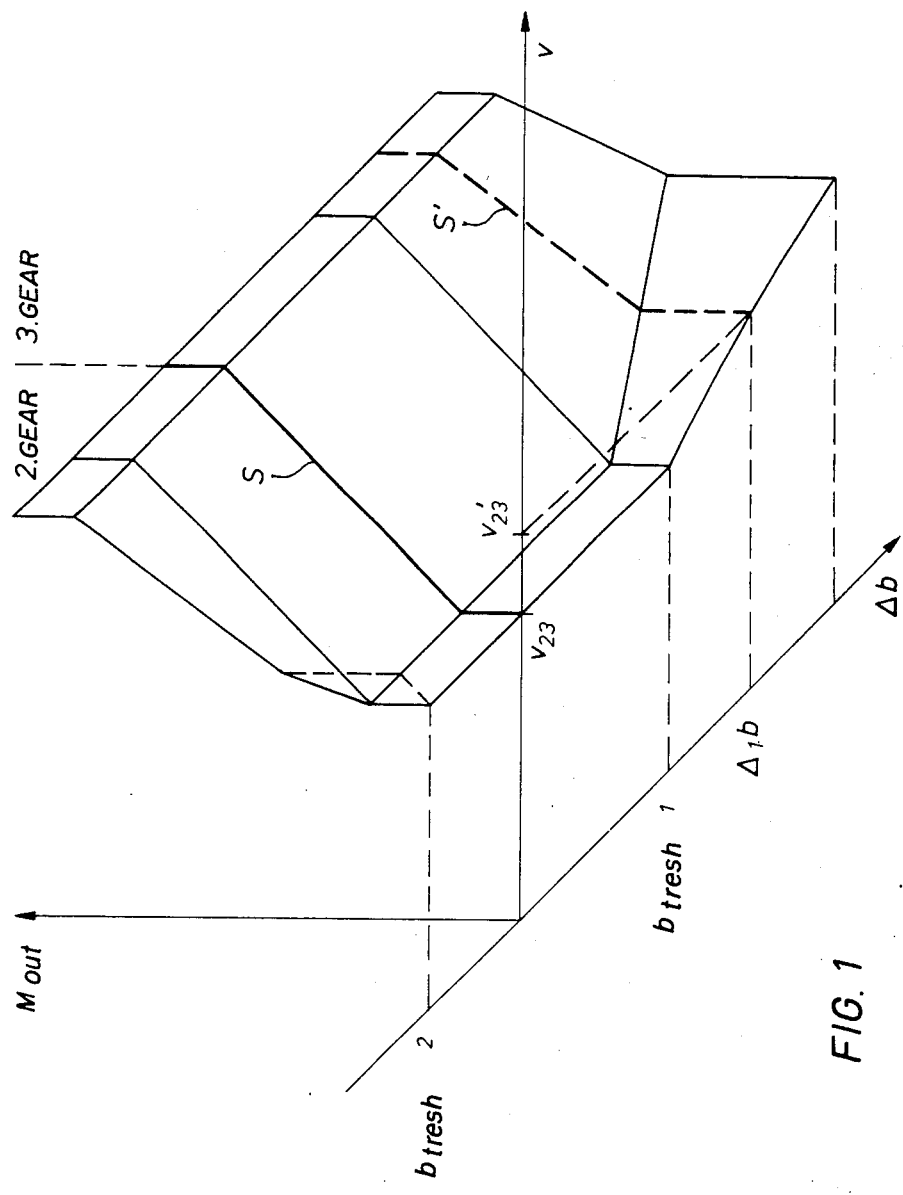

Changes effected in the characteristic curve S in accordance with the invention are shown schematically in FIG. 1. A usual shift characteristic curve S for shifting from the second into the third gear is entered into a two-dimensional coordinate system (output torque $M_{out}$/vehicle speed v). This characteristic curve S corresponds to the permanently set shift characteristic curve in conventional gear control apparatus. For operating points over shift characteristic curve S, the second gear is to be set in, while for operating points underneath curve S, the operation is in third gear. For low output torques $M_{out}$ an upshift occurs at a vehicle velocity $v_{23}$. If the difference between the desired and the actual acceleration is designated by $\Delta b$ and this value is used to determine changes in the shift characteristic curve S, then, in accordance with a preferred embodiment of the present invention, a value of $\Delta b$ which is smaller than a threshold value $b_{thresh}$ does not lead to a change in the shift characteristic curve S. Only when $\Delta b$ exceeds the threshold value $b_{thresh}$ does a change in the shift characteristic curve occur. This is illustrated in FIG. 1 by introducing $\Delta b$ as a third coordinate. The shift characteristic curve does not change if the difference $\Delta b$ stays in a region between two threshold values $b_{thresh\,1}$ and $b_{thresh\,2}$, which may be different for positive and negative acceleration differences. Only when a value $\Delta_{1b}$ arises which exceeds the threshold value is the characteristic curve S modified to be a characteristic curve S', as illustrated in FIG. 1. The modified characteristic curve S' causes the speed at which a shift occurs at small output torques $M_{out}$ to be shifted from the value $v_{23}$ to a value $v_{23'}$.

The extent of the change of characteristic curve S is determined by the fact that the output torque available in the new gear must exceed the then-present resistance to travel, so that the acceleration process may be maintained, for example during upshift under load. In a preferred embodiment of the invention, a threshold value $\Delta W$ is added to the then-present resistance to travel $W_{ist}$ so that the transmission will remain in the new gear, i.e. that hunting is prevented. The threshold value $\Delta W$ may either be a fixed value or may be affected by the then-present operating conditions of the vehicle, such as engine speed, actual acceleration, etc.

The engine torque available in the new gear must first be computed. For this purpose, the engine speed is computed relative to the new gear with the change in gear ratios i; the associated engine torque is determined, for example by reading out the values stored in a read-only memory for approximating characteristic engine curves. From this value, the output torque is determined by multiplication by the change in gear ratios i. If the comparison shows that the so-computed output torque is smaller than the then-present resistance to travel $W_{ist}$ (or $W_{ist} + \Delta W$) the shift process is suppressed and the characteristic curve S is shifted until the operating conditions are such that, after the shift, the new output torque will certainly exceed the resistance to travel. Alternatively, and in a simpler embodiment, the shift process may simply be suppressed without any further change in the characteristic shift curve. In both cases, a safety circuit operates in such a way that the engine speed cannot exceed a predetermined maximum allowable speed.

Figure 2:
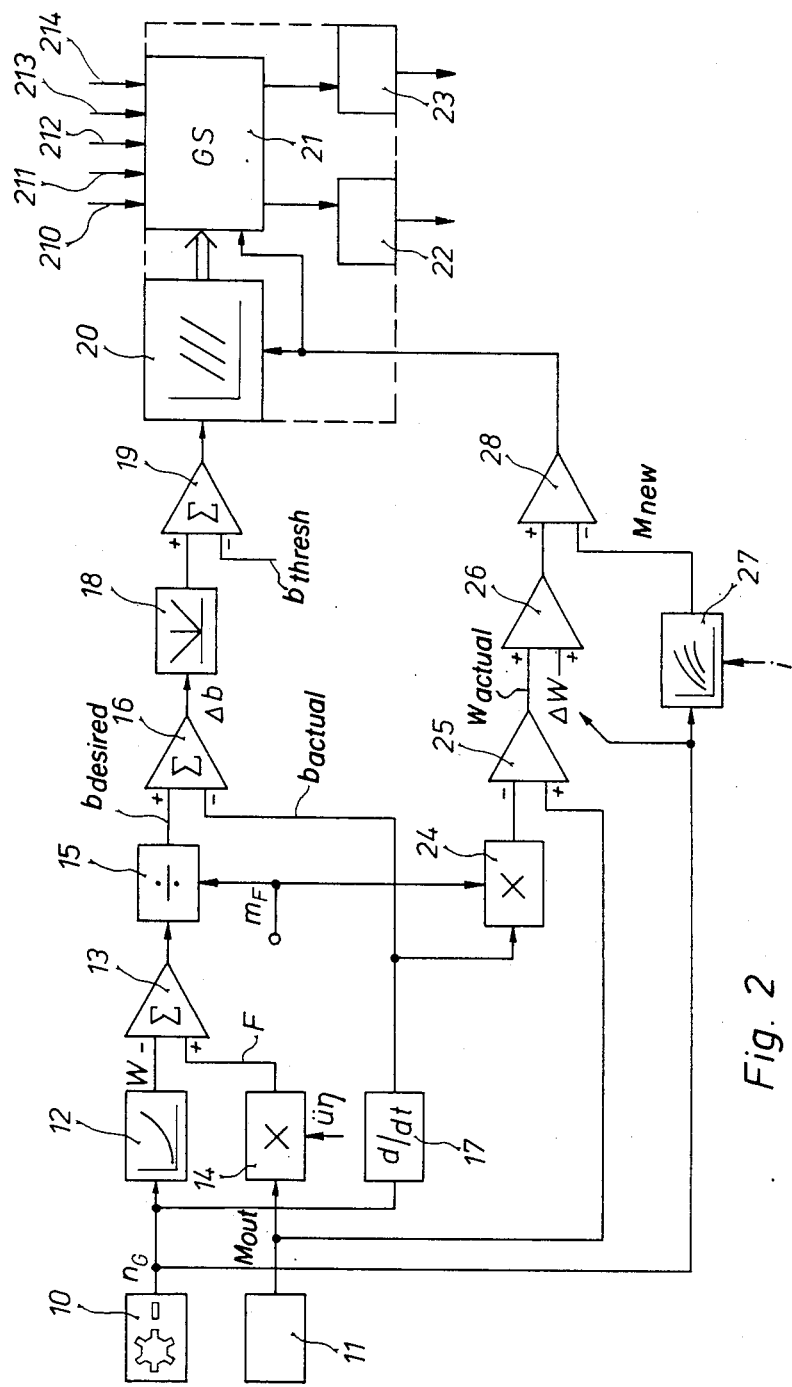

FIG. 2 is a block diagram of one embodiment of the control system of the present invention. On the input side the following required operating parameters are supplied: transmission speed nG by a transmission speed sensor 10 and output torque $M_{out}$ from an output torque sensor 11. As mentioned previously, it is of course also possible to compute the output torque $M_{out}$ from the engine speed or the transmission speed or the vehicle speed by means of the family of characteristic engine curves. Specifically, sensor 10 is connected to a computing stage 12, which has a plurality of storage locations from each of which a value W of resistance to travel for a level road and at some nominal load may be read out. Signal W, herein referred to as a resistance signal, at the output of stage 12 is proportional to this value. The signal W is applied to the inverting input of a summing stage 13. The non-inverting input of the summing stage 13 is connected to the output of a multiplication stage 14. The input of multiplication stage 14 is connected to the output torque sensor 11 and its multiplier input receives a signal corresponding to the value of the product ü·η, ü being, as mentioned before, a factor derived from the transmission ratio of the differential and the main pinion radius, while η is the efficiency of the drive train. The output signal of multiplier stage 14 then corresponds to the driving force F. This signal is applied to one input of the divider stage 15 whose divisor input receives a signal corresponding to the vehicle mass $m_F$. The output of divider stage 15 is connected to the positive input of a summing stage 16. A inverting input of summing stage 16 is connected to the output of a differentiating stage 17. The input of differentiating stage 17 is connected to the gear speed sensor 10.

The output signal of divider stage 15 corresponds to the desired value of acceleration and is computed according to the equation:

$$b_{desired} = (M\ddot{u}\eta - W)/m_F$$

The output signal of differentiating stage 17 of course corresponds to the actual value of acceleration $b_{ist}$. The output of summing stage 16 thus is a signal corresponding to the difference $\Delta b$. It is converted to an absolute value in stage 18. The output of stage 18 is connected to the direct input of a summing stage 19 whose inverting input receives a constant which signifies the threshold value of acceleration. The output signal of the summing stage is applied to the control apparatus for the automatic transmission. The latter consists of a computing stage 20 in which the values for approximating the shift characteristic curves are stored. The output of computing stage 20 is applied to an overall gear control stage 21 whose outputs are connected to a stage 22 furnishing the shift selection signal and a pressure control stage 23. The overall gear control stage 21 has inputs 210, 211, 212, 213, and 214 for receiving signals signifying the then-present values of various operating parameters such as the position of the gear selector lever, the transmission output speed, the position of the throttle valve, etc.

Stages 21, 22 and 23 are conventional stages. Stage 20 includes storage locations for a plurality of families of shift characteristic curves which are selected in dependence on the output signal from summing stage 19. This signal signifies whether the difference $\Delta b$ does or does not exceed the threshold value $b_{thresh}$. If $\Delta b$ exceeds $b_{thresh}$, the change in the shift characteristic curve S takes place in dependence upon the difference $\Delta b$. If the threshold value is to be different for positive and negative values of $\Delta b$, it is of course necessary that the threshold value at the inverting input of summing stage 19 is switched in accordance with the polarity of the output signal of summing stage 16.

Circuits for computing the output torque available in the new gear and for determining whether this output torque suffices to overcome the then-present tractive resistance are also provided in the block diagram of FIG. 2. Specifically, a multiplication stage 24 is provided for forming the product of the vehicle mass $m_F$ and the actual acceleration $b_{ist}$. This product is subtracted in a subtraction stage 25 from the then-present output torque $M_{out}$. The result is $W_{ist}$ the actual then-present resistance to travel to which, preferably, an incremental value $\Delta W$ is added in a summing stage 26. The incremental value may be a constant or may vary as a function of speed. The output signal of stage 26 is compared in a comparator 28 to the output torque in the new gear. The latter is computed from the gear speed nG and the change in gear ratio i as applied to a computing stage 27 storing values for approximating characteristic engine curves. The output signal of comparator 28 is positive if the output torque in the new gear is smaller than the actual resistance to travel or the resistance to travel including the additional incremental value $\Delta W$. Under these conditions, the shift may be suppressed (output signal of stage 28 connected to stage 21) or a further shifting of the characteristic curves in stage 20 takes place. Further, the overall gear control 21 monitors the engine speed so that a predetermined maximum speed cannot be exceeded.

Although the invention has been described in a preferred embodiment, modification and changes thereof will readily be apparent to one skilled in the art and are intended to be included in the following claims.

I claim:

1. Control apparatus for an automatic transmission in a motor vehicle, comprising:
   means for furnishing a desired acceleration signal, said means comprising a combination of
   first means (10) for furnishing a speed signal signifying the then-present vehicle speed;
   second means (11) for furnishing a torque signal signifying then-present transmission output torque;
   third means (12) for furnishing a resistance signal signifying the resistance to travel of said vehicle at a predetermined load and on a level road, and
   fourth means (14, 13, 15) for computing said desired acceleration signal from said resistance and torque signals in accordance with the equation $$b_{desired}=(M_{out}\ddot{u}\eta - W)/m_F$$

where
   $m_F$ is the mass of the vehicle,
   ü is the product of the transmission ratio of the differential and the main pinion radius, and
   $\eta$ is the efficiency of the drive train;
   means (17) for furnishing an actual acceleration signal signifying the actual acceleration of said vehicle;
   first comparator means (16) connected to said means for furnishing an actual acceleration signal and said means for furnishing a desired acceleration signal, for comparing said actual to said desired acceleration signal and furnishing a first difference signal corresponding to the difference therebetween;
   second comparator means (19) for comparing said first difference signal to a predetermined acceleration threshold signal and furnishing a second difference signal only when said first difference signal exceeds said predetermined acceleration threshold signal; and
   computing means (20, 21) connected to said second comparator means for furnishing a standard gear shift control signal from a gear of said transmission which is then in operation to another gear of said transmission into which other gear a shift is expectable on the basis of nominal shift characteristics, said standard gear shift control signal being derived from said nominal shift characteristics in the absence of said second difference signal and for also furnishing a modified shift control signal derived from an auxiliary shift characteristic in the presence of said second difference signal;
   means (27) for furnishing a new torque signal signifying the torque to be expected in said other gear;
   means (24,25) for furnishing an actual resistance signal signifying the then-present resistance to vehicle travel and obtained by subtracting the product of the mass of the vehicle and said actual acceleration signal from said torque signal signifying then-present transmission torque, and
   third comparator means connected to said means for furnishing an actual resistance signal, said means for furnishing a new torque signal and said computing means for impeding the generation of said gear shift control signal when said new torque signal is less than said actual resistance signal.

2. Apparatus as set forth in claim 1, wherein said transmission torque is the transmission output torque.

3. Apparatus as set forth in claim 1, wherein said first difference signal is a positive signal when said desired acceleration signal exceeds said actual acceleration signal and a negative signal when said actual acceleration signal exceeds said desired acceleration signal; and
   wherein said predetermined acceleration threshold signal has a first threshold value when said first difference signal is a positive signal and a second threshold value when said first difference signal is a negative signal.

4. A control system as set forth in claim 1, further comprising means (26) interconnected between said means for furnishing said actual resistance signal and said third comparator means for adding a resistance increment signal to said actual resistance signal.

* * * * *